(12) United States Patent
Bolzacchini

(10) Patent No.: US 9,688,432 B2
(45) Date of Patent: Jun. 27, 2017

(54) STUFFING MACHINE FOR FOOD PRODUCTS

(71) Applicant: INOX MECCANICA S.R.L., Goito, Frazione Solarolo (IT)

(72) Inventor: Giovanni Bolzacchini, Goito (IT)

(73) Assignee: INOX MECCANICA S.R.L., Goito, Frazione Solarolo (IT)

( * ) Notice: Subject to any disclaimer, the term of this patent is extended or adjusted under 35 U.S.C. 154(b) by 0 days.

(21) Appl. No.: 15/079,830

(22) Filed: Mar. 24, 2016

(65) Prior Publication Data

US 2016/0288941 A1 Oct. 6, 2016

(30) Foreign Application Priority Data

Apr. 1, 2015 (IT) .............................. VR2015A0053

(51) Int. Cl.
*A22C 11/00* (2006.01)
*B65B 63/02* (2006.01)
(Continued)

(52) U.S. Cl.
CPC .............. *B65B 63/02* (2013.01); *A22C 11/02* (2013.01); *A22C 11/06* (2013.01); *B65B 25/065* (2013.01); *B65B 43/54* (2013.01)

(58) Field of Classification Search
CPC ... A22C 11/00; A22C 11/005; A22C 11/0209; A22C 11/006; A22C 13/0003; A22C 11/0227; A22C 11/0218
(Continued)

(56) References Cited

U.S. PATENT DOCUMENTS 3,857,330 A * 12/1974 Ruckstaetter ............ A22C 7/00
425/127
4,548,573 A * 10/1985 Waldstrom ............... A23G 9/04
425/126.2
(Continued)

FOREIGN PATENT DOCUMENTS

| EP | 1 867 233 A1 | 12/2007 |
| ES | 1 066 263 U | 1/2008 |
| ES | 2 389 537 A1 | 10/2012 |

OTHER PUBLICATIONS

Italian Search Report for IT VR2015A000053 dated Nov. 3, 2015.
European Search Report from European Patent Appl. No. 16162473.9-1655, dated Aug. 25, 2016.

*Primary Examiner* — Richard Price, Jr.
(74) *Attorney, Agent, or Firm* — Koppel, Patrick, Heybl & Philpott

(57) ABSTRACT

A stuffing machine for food products, comprising a framework that supports at least one die, provided with a recess designed to receive a product to be stuffed, and pusher means adapted to translate the product to be stuffed, formed in the die, through a stuffing tube; at least one conveyor is also provided which is adapted to move the die along at least one forward path from at least one loading position, in which the die is adapted to receive the product to be stuffed, to a working position, in which the die is substantially at a region of action of the pusher means, and along at least one return path from the working position to the loading position; the conveyor is adapted to keep the die with the concavity of its recess directed upwardly along the forward path and along the return path.

15 Claims, 10 Drawing Sheets

(51) Int. Cl.
*A22C 11/02* (2006.01)
*A22C 11/06* (2006.01)
*B65B 25/06* (2006.01)
*B65B 43/54* (2006.01)

(58) Field of Classification Search
USPC .......... 452/30–32, 21–26, 35–37, 46–48, 51
See application file for complete search history.

(56) References Cited

U.S. PATENT DOCUMENTS

| | | | | |
|---|---|---|---|---|
| 4,666,722 A | * | 5/1987 | Creed | A23L 3/362 |
| | | | | 426/393 |
| 4,747,186 A | * | 5/1988 | Spike | A22C 11/04 |
| | | | | 452/33 |
| 4,800,094 A | * | 1/1989 | Freda | B26D 7/0608 |
| | | | | 426/513 |
| 6,645,062 B1 | | 11/2003 | Buckles | |
| 7,314,405 B2 | * | 1/2008 | Florindo | A22C 11/04 |
| | | | | 452/31 |

\* cited by examiner

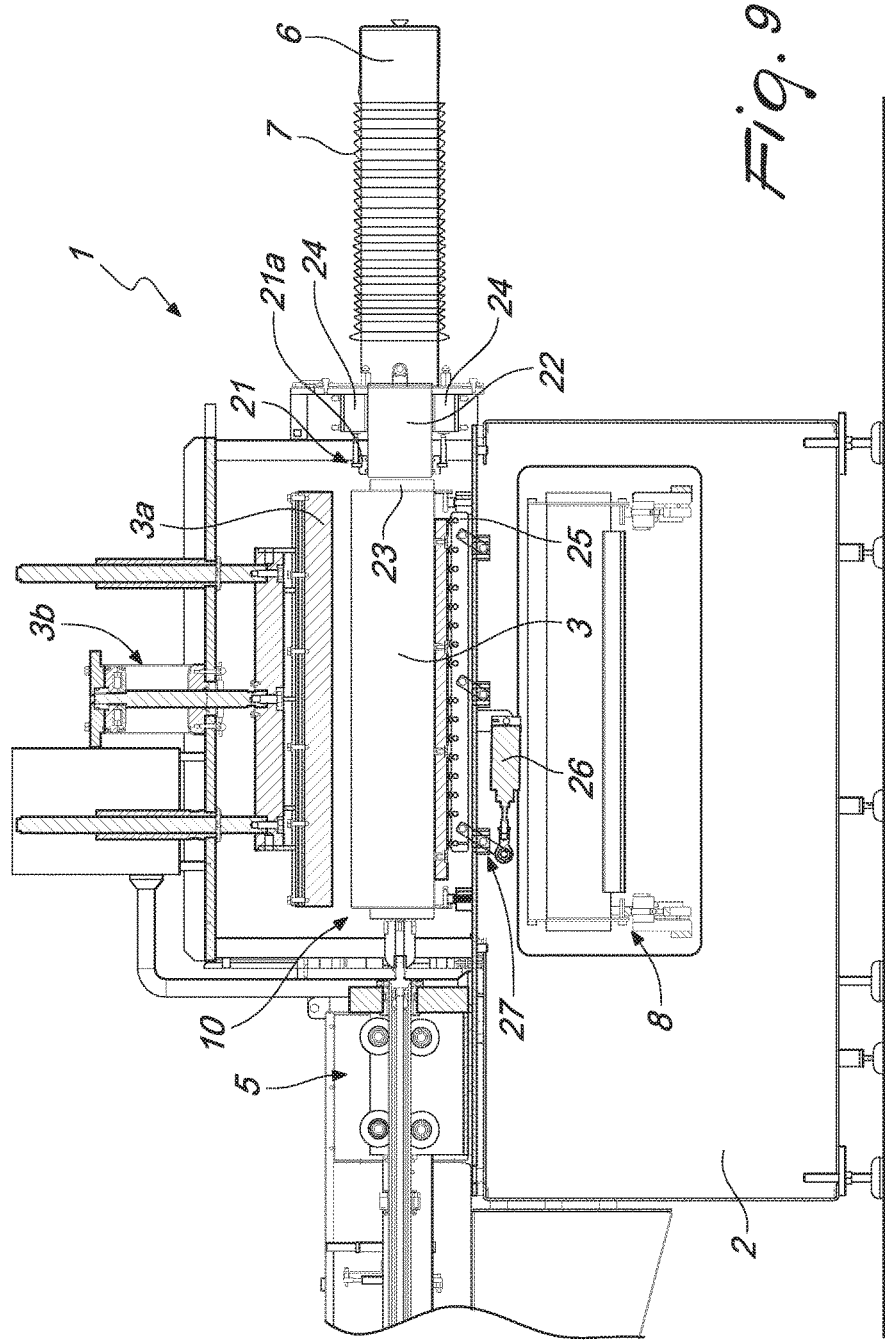

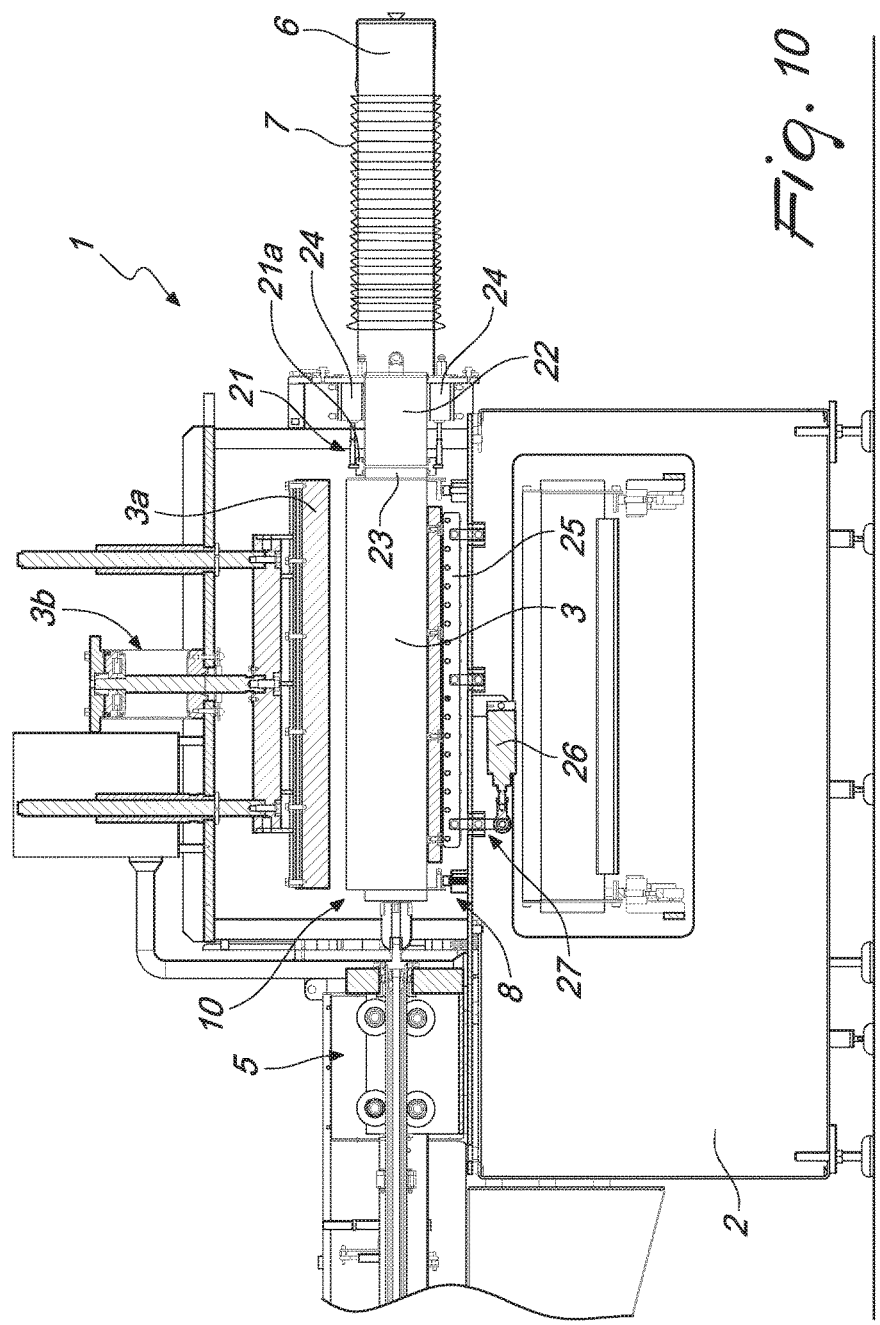

STUFFING MACHINE FOR FOOD PRODUCTS

The present invention relates to a stuffing machine for food products.

Stuffing machines are known in the food sector which perform the stuffing of food products, particularly pieces of meat, in a tubular wrapping casing, constituted by an elastic net or by a gut casing, with the application of suitable closing clips at the two ends of the wrapping casing.

This type of machine has, on a supporting structure, a forming die provided with a recess, which is open upwardly and in which an operator places the product to be stuffed in order to form it, before proceeding with its insertion inside the wrapping casing, by closing such die by means of a counter-die.

Moreover, a pusher acts at the forming die and translates the product formed in the die along an advancement direction, making it pass through a stuffing tube, on which a wrapping casing is loaded which is closed at its end located at the exit of the stuffing tube.

In this manner, when the product exits from the stuffing tube, it can entrain with it the wrapping casing, being completely wrapped by it.

A clipping machine then closes the tubular casing at the other end as well.

In traditional machines there is a single forming die, which at the end of each operation for stuffing a product is reopened and reloaded with a new product to be stuffed, with an expenditure of time and a subsequent slowing of production.

In order to obviate this drawback, machines have been devised which are provided with a plurality of forming dies connected to conveyor means, constituted by conveyor belts or chains extending between a pair of driving pulleys, which allow to move the forming dies, so as to place each time a forming die loaded with the product to be stuffed in the region of action of the pusher.

In particular, in this type of machine, along a forward portion of the conveyor means the forming dies are arranged so that the access opening of their cavity faces upwardly, so as to allow their loading with the food products to be stuffed and their subsequent placement in the working region of the pusher, while along a return portion they are upside down and consequently their access opening faces downwardly.

Examples of machines of this type are disclosed in U.S. Pat. No. 6,645,062 and in ES2389537.

A problem of machines of this type is that it is not possible to use the return portion of the conveyor means for operations for loading or processing the products in the forming dies.

Moreover, along the return portion of the conveyor means the forming dies can release any residual pieces of product, which dirty the underlying regions of the machine, with a waste of product.

Another drawback of this type of machine is that the uncoupling of the forming dies from the conveyor means is quite complex and laborious.

The aim of the present invention is to solve the problems of the background art, by providing a stuffing machine for food products that allows to operate on the forming dies also along the return portions of the conveyor means.

Within this aim, an object of the invention is to provide a stuffing machine for food products that allows a high cleanliness and avoids product loss.

Another object of the invention is to provide a stuffing machine for food products that allows easy positioning and equally simple and fast removal of the forming dies from the machine.

This aim and these and other objects that will become better apparent hereinafter are achieved by the stuffing machine for food products, according to the invention, as defined in the appended claims.

Further characteristics and advantages of the invention will become better apparent from the description of some preferred but not exclusive embodiments of the machine according to the invention, illustrated by way of non-limiting example in the accompanying drawings, wherein:

FIG. 9 is a partially sectional view, taken along a vertical plane that is parallel to the direction of movement of pusher means and passes through a die placed at said pusher means, of another possible constructive variation in a first operating condition;

FIG. 10 is a view of the variation of FIG. 9 in a second operating condition.

Figure 1:
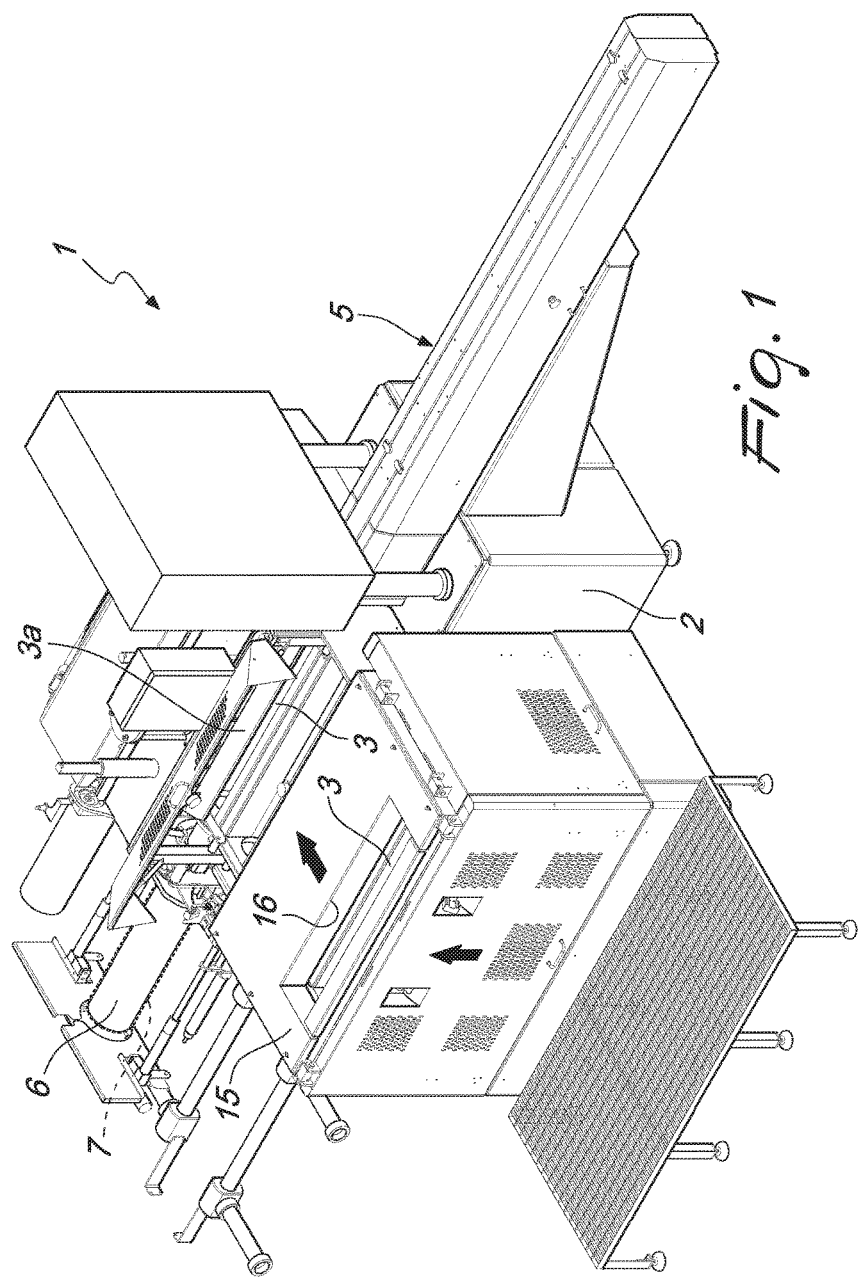
FIG. 1 is a schematic perspective view of a stuffing machine according to the invention, with a portion of its case open in order to show its interior.

With reference to the figures, the stuffing machine for food products, according to the invention, generally designated by the reference numeral 1, comprises a framework 2, which supports at least one die 3, which has a recess 4 designed to receive a product to be stuffed.

The framework 2 supports, moreover, pusher means 5, constituted for example by a piston and by the corresponding movement cylinder, which allow to translate the product to be stuffed, formed in the die 3, through a stuffing tube 6, on which a tubular casing 7, such as for example a net or gut, designed to wrap around the product to be stuffed, is fitted externally.

The longitudinal ends of the die 3 are open to allow the passage of the pusher means 5 inside the corresponding recess 4.

The forming of the product in the die 3 is provided appropriately by means of a counter-die 3a, which is located in the region of action of the pusher means 5 and can be actuated in motion, by way of actuation means 3b, with respect to the framework 2.

More particularly, in the machine according to the invention the die 3 is moved by conveyor means 8 along at least one forward path 8a, which is extended between at least one loading position 9, in which the die 3 is adapted to receive the product to be stuffed, and a working position 10, in which the die 3 is substantially at the region of action of the pusher means 5, as well as of the counter-die 3a.

The conveyor means 8, moreover, move the die 3 along at least one return path 8b that is extended from the working position 10 to the loading position 9.

The particularity of the invention resides in that the conveyor means 8 are adapted to keep the die 3 with the concavity of its own recess 4 facing upwardly, both along the forward path 8a and along the return path 8b.

In this manner it is possible to perform processing operations on the die 3 both along its forward path 8a and along its return path 8b. Moreover, escape of product residues from the die 3 during the return path 8b is prevented.

Conveniently, the die 3 is simply rested on the conveyor means 8, so that it can be placed easily and quickly on the conveyor means 8 and removed just as easily and quickly from them.

Advantageously, the machine according to the invention is provided with a plurality of dies 3 that are moved by the conveyor means 8, so as to allow their placing in succession in the region of action of the pusher means 5.

Conveniently, the forward path 8a and the return path 8b of the conveyor means 8 provide a closed path for the dies 3.

In particular, according to one possible embodiment, the forward path 8a and the return path 8b of the conveyor means 8 are extended at least partially on planes arranged at mutually different heights with respect to the ground.

Conveniently, the return path 8b lies on a plane arranged at a lower height than the plane on which the forward path 8a lies. However, there is nothing to prevent that the return path 8b of the dies 3 from lying on a plane arranged at a greater height than the plane on which the forward path 8a lies.

As an alternative, the forward path 8a and the return path 8b might lie substantially on a same plane.

The forward path 8a or the return path 8b, or both, may also each have respective portions of path of the dies 3 that lie substantially at right angles to each other, preferably on a same plane, so as to be able to provide along the forward and return paths 8a, 8b of the conveyor means 8 different working lines on which it is possible to perform several operations on the products and on the dies 3.

In greater detail, the conveyor means 8 are conveniently provided by at least one conveyor belt, and more particularly, comprise, advantageously, at least one first conveyor belt 11a, which defines at least one portion of the forward path 8a of the conveyor means 8, and at least one second conveyor belt 11b, which defines in turn at least one portion of the return path 8b of the conveyor means 8.

Conveniently, the conveyor means 8 comprise, moreover, lowering means 12 and lifting means 13 for the dies 3 that allow to mutually connect the first conveyor belt 11a and the second conveyor belt 11b.

Figure 3:
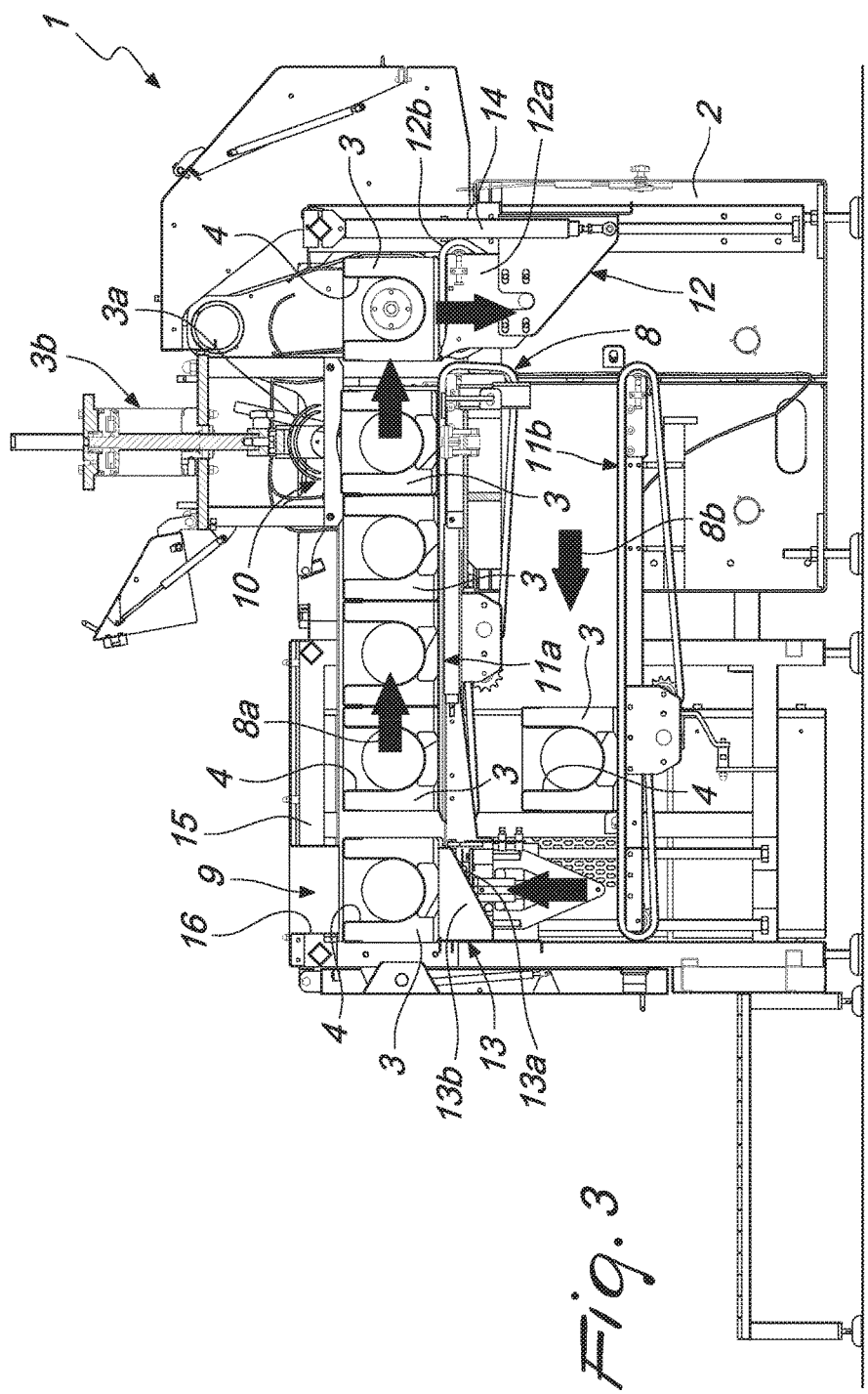
FIG. 3 is a sectional view, taken along the line III-III of FIG. 2.

With reference to the embodiment shown in particular in FIG. 3, the first conveyor belt 11a is, for example, arranged in an upward region with respect to the second conveyor belt 11b.

More particularly, as can be seen again in FIG. 3, the lowering means 12 allow, in this case, to convey the dies 3 from the plane on which the first conveyor belt 11a is located to the plane on which the second conveyor belt 11b is located, while the lifting means 13 allow to carry the dies 3 from the plane on which the second conveyor belt 11b is located to the plane on which the first conveyor belt 11a is located.

Optionally, the first conveyor belt 11a might also be arranged in a downward region with respect to the second conveyor belt 11b and in this case the lifting means 13 carry the dies 3 from the plane on which the first conveyor belt 11a is located to the plane on which the second conveyor belt 11b is located, while the lowering means 12 have the task of returning the dies 3 from the plane on which the second conveyor belt 11b is located to the plane on which the first conveyor belt 11a is located.

Advantageously, the lowering means 12 and the lifting means 13 each comprise a respective supporting body 12a, 13a, that defines at least one resting region adapted to engage the lower surface of at least one die 3 and can be moved on command along a substantially vertical direction, with respect to the framework 2.

In greater detail, with reference to the example of embodiment of FIG. 3, the supporting body 12a of the lowering means 12 is adapted to receive by resting contact at least one die 3 that arrives from the first conveyor belt 11a and can be moved downwardly, with respect to the framework 2, so as to carry the die 3 that rests on it from the arrival end of the first conveyor belt 11a to the starting end of the second conveyor belt 11b.

Conveniently, the supporting body 12a of the lowering means is actuated in motion by an actuator cylinder 14 and supports a belt conveyor 12b that allows to move on the supporting body 12a a die 3 that arrives from the first conveyor belt 11a and then deliver it to the second conveyor belt 11b.

Advantageously, the supporting body 13a of the lifting means 13 has, in turn, brackets 13b designed to engage by resting contact in a downward region a die 3 that arrives from the second conveyor belt 11b and to move it along a substantially vertical direction, so as to carry it to the height level of the first conveyor belt 11a. The supporting body 13a of the lifting means 13 also can be provided advantageously with means for moving the die 3 that rests on it toward the first conveyor belt 11a.

The substantially vertical movement of the supporting body 13a of the lifting means 13 can be controlled conveniently by means of a respective actuator cylinder, not shown.

It should be noted that the lowering means 12 are conveniently placed downstream of the working position 10, with respect to the advancement direction of the dies 3 on the first conveyor belt 11a, while the lifting means 13 can be, optionally, arranged so as to deliver the dies 3 to the first conveyor belt 11a at the loading position 9 thereof.

Figure 2:
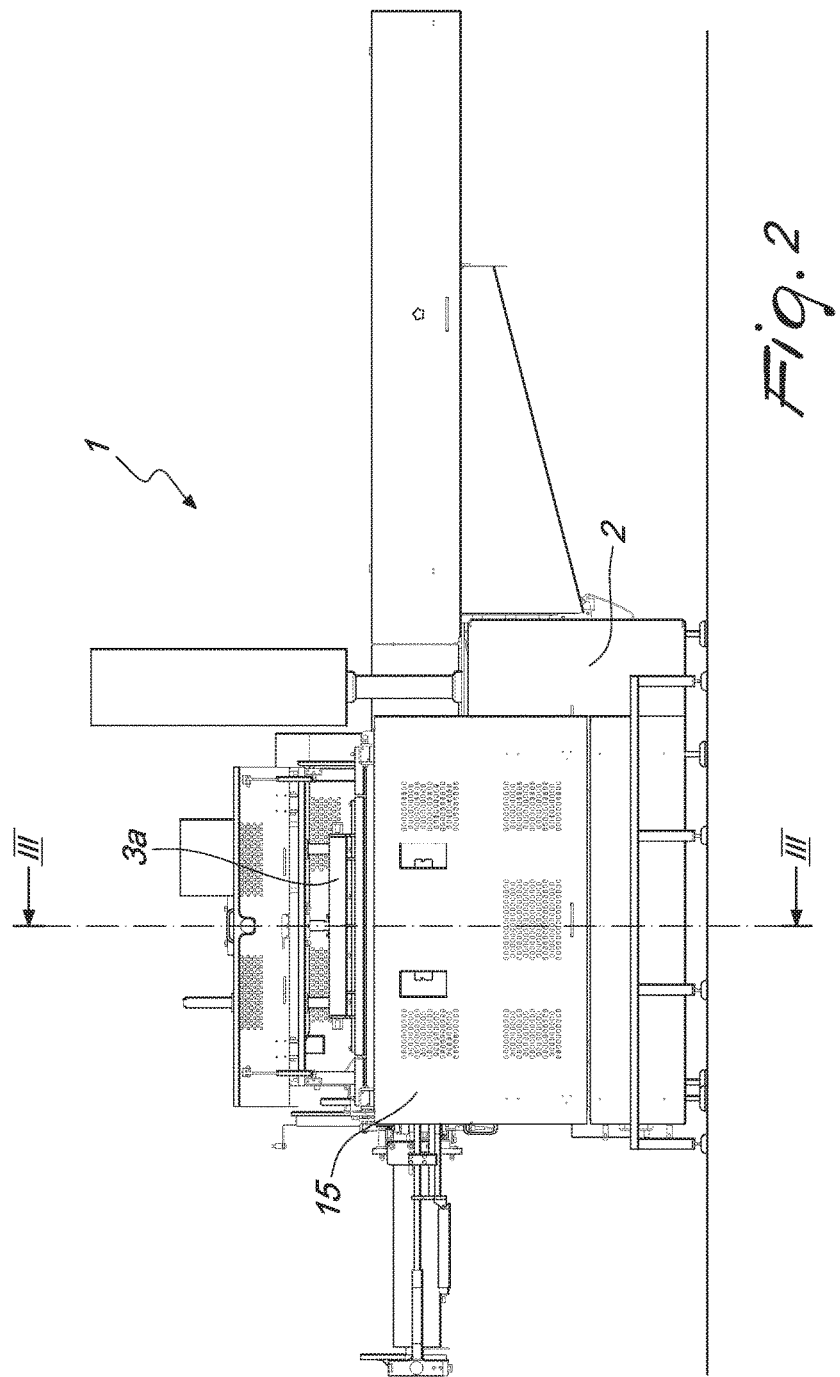
FIG. 2 is a side view of the machine according to the invention.

With reference again to the embodiment of FIGS. 1-3, it can be noted that the conveyor means 8 can be covered by a case 15 that has, advantageously, at the loading position 9 of the dies 3, a cutout 16, through which an operator can load onto the dies 3 that pass on the conveyor means 8 a respective product to be stuffed.

Figure 4:
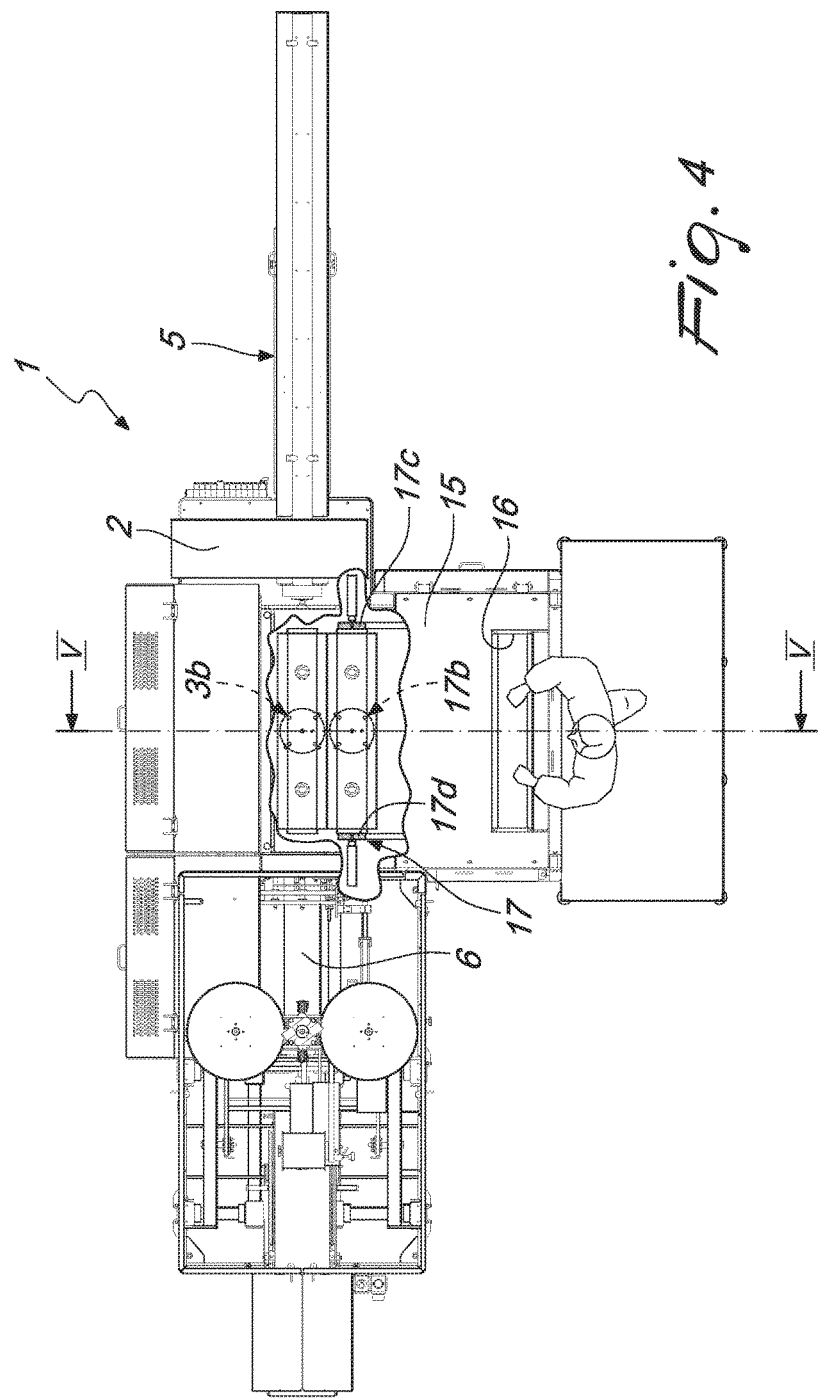
FIG. 4 is a partially cutout top plan view of an embodiment of the machine according to the invention in which there is a station for preforming the products to be stuffed.
Figure 5:
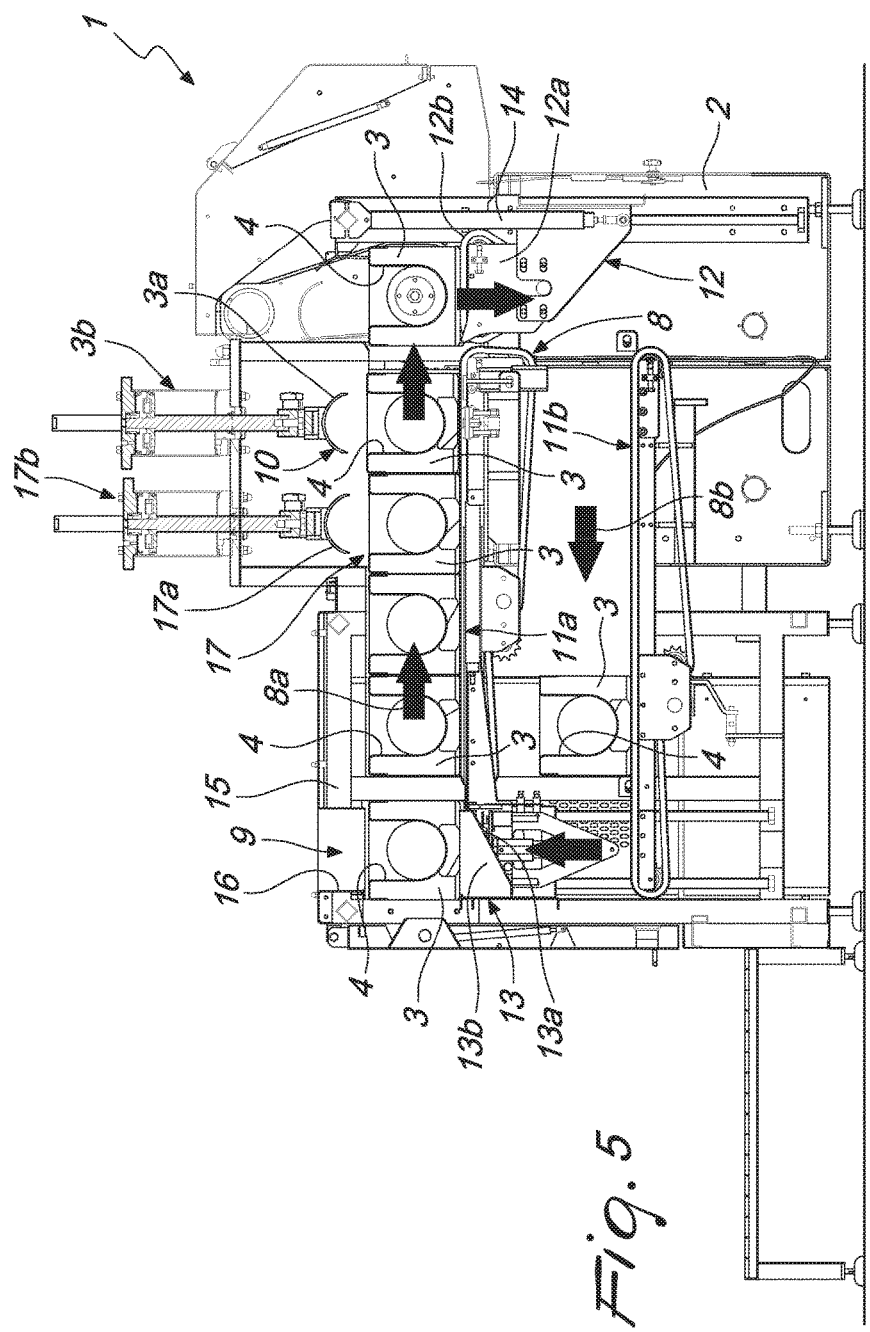
FIG. 5 is a sectional view, taken along the line V-V of FIG. 4.

With reference to the embodiment of FIGS. 4 and 5, along the forward path 8a of the conveyor means 8, between the loading position 9 and the working position 10 of the dies 3, there can be a preforming station 17, in which at least one preforming counter-die 17a acts, moved by corresponding actuators 17b, with respect to the framework 2, which allows to preform the products contained in the dies 3 before the latter are brought into the working position 10.

Advantageously, in the preforming station 17, in addition to the preforming counter-die 17a, there can be also means for lateral compression, constituted for example by a pair of compression pistons 17c, 17d, which are mutually opposite and are adapted to compress the products contained in the dies 3 along a direction that is substantially parallel to the longitudinal extension of the dies 3, being introduced in such dies through their longitudinal ends.

As shown in particular in FIG. 5, the preforming counter-die 17a and the counter-die 3a are conveniently arranged mutually side by side, above the first conveyor belt 11a.

Figure 6:
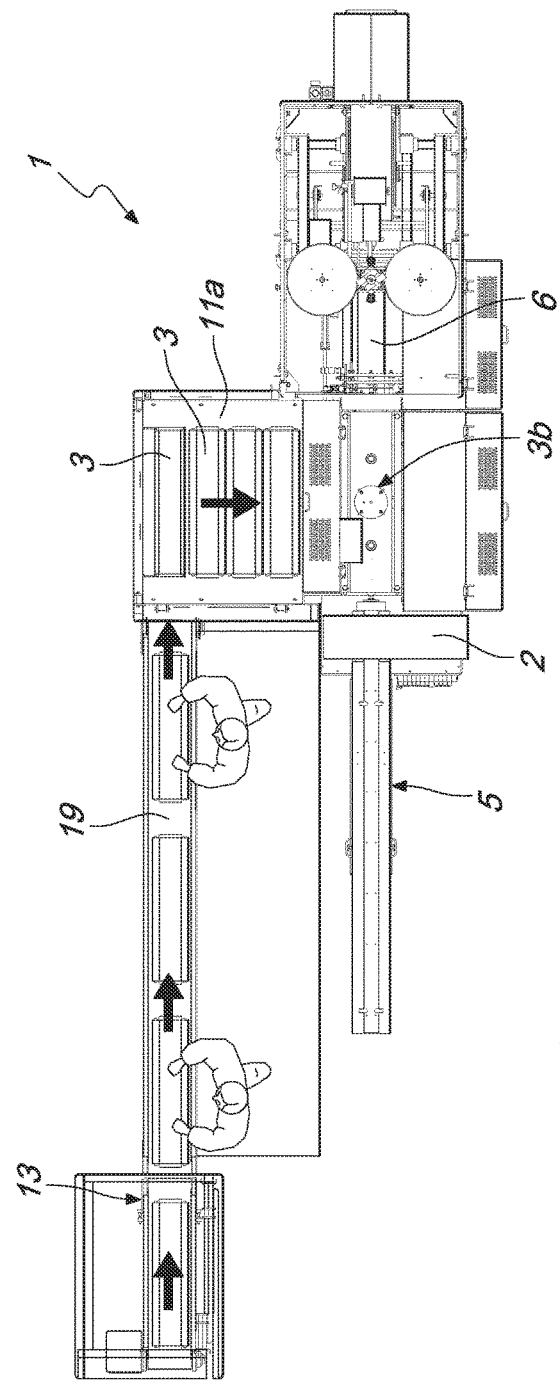
FIG. 6 is a top plan view of another embodiment of the machine according to the invention.
Figure 7:
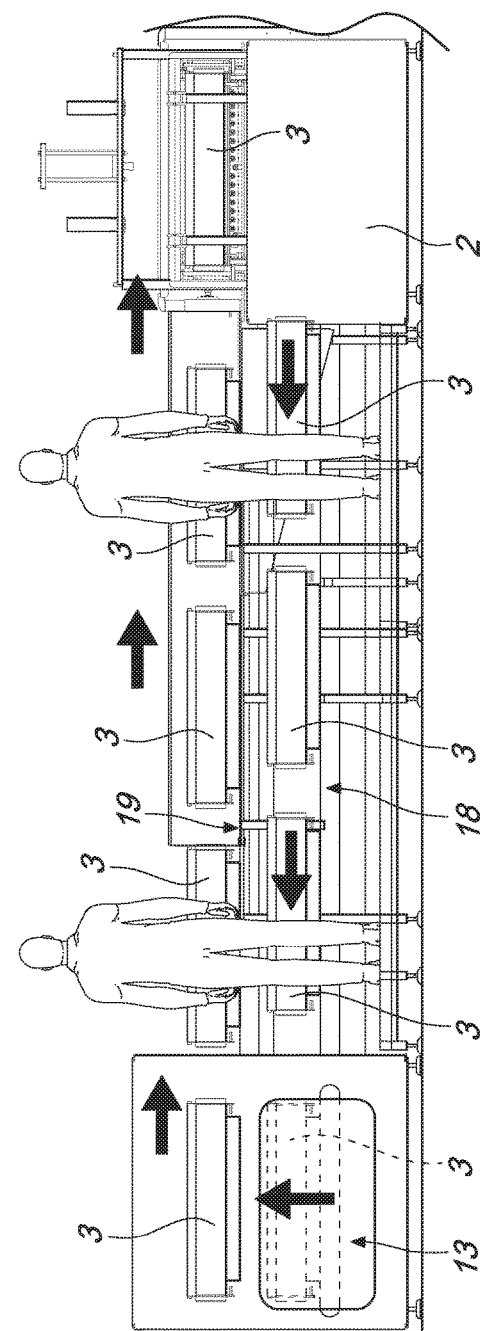
FIG. 7 is a schematic side view of the embodiment of FIG. 6.

FIGS. 6 and 7 show an alternative solution in which the forward path 8a and the return path 8b of the conveyor means 8 have portions at right angles to each other.

More particularly, in this solution, the empty dies 3, which arrive from the second conveyor belt 11b, instead of being directly carried by the lifting means 13 onto the second conveyor belt 11b, are extracted from the machine and diverted onto a first linear conveyor 18, preferably of the belt type, that is extended substantially at right angles to the second conveyor belt 11b and allows to extend the length of the return path 8b, so as to be able, optionally, to perform, along its extension, several operations on the dies 3, such as for example operations for cleaning, removal of waste, replacement with other dies 3 and so on.

Once they have traveled along the first linear conveyor 18, the empty dies 3 are carried by the lifting means 13 onto a second linear conveyor 19, also preferably of the belt type, that is extended parallel and in an upward region with respect to the first linear conveyor 18, and along which one or more operators load the dies 3 with a new product to be stuffed and, optionally, other processes are also performed on the products loaded onto the dies 3, such as, for example, salting, spicing or others.

The second linear conveyor 19 then delivers the loaded dies 3 to the first conveyor belt 11a, which sends them to the working position 10, for the operations for forming and stuffing the products loaded therein.

Figure 8:
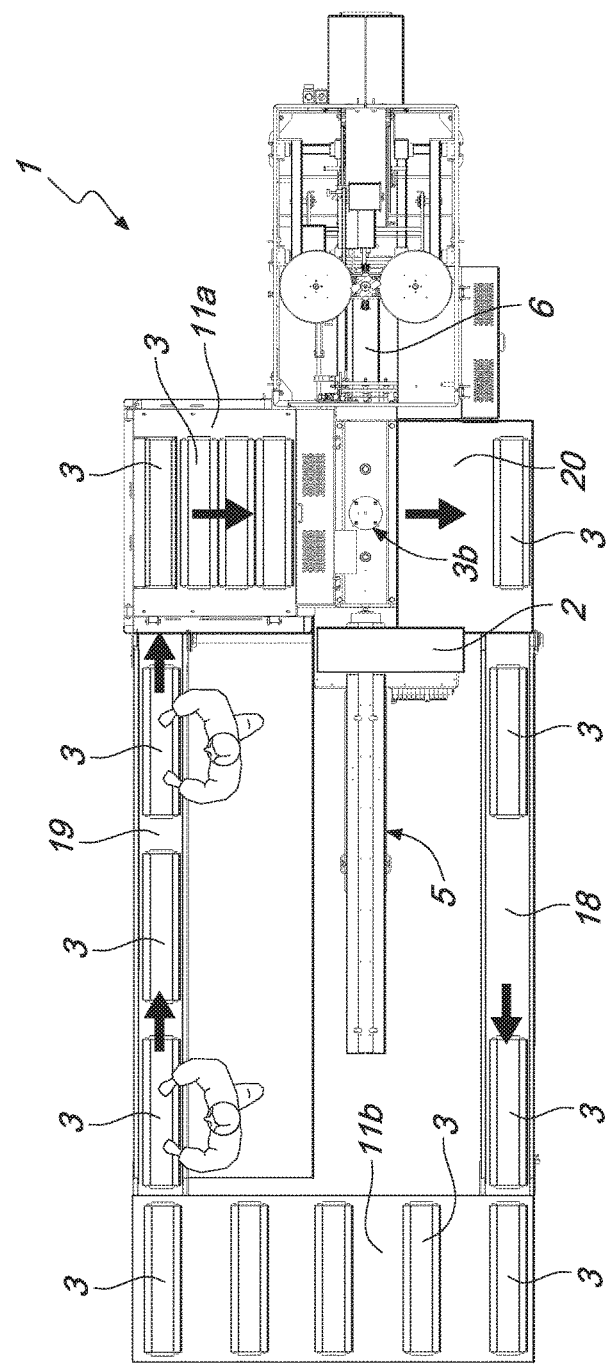
FIG. 8 is a schematic top plan view of a further embodiment of the machine according to the invention.

FIG. 8 shows a further constructive solution, in which the forward path 8a and the return path 8b of the conveyor means 8 lie on a same plane.

In greater detail, in this case, there is a first conveyor belt 11a and a second conveyor belt 11b arranged, mutually parallel and spaced, at a same height level, and there is also a first linear conveyor 18 and a second linear conveyor 19, which are extended substantially transversely to the extension direction of the first and second conveyor belts 11a and 11b and allow to mutually connect the first and the second conveyor belts 11a and 11b, so as to form a closed circuit for the advancement of the dies 3.

It should be noted that, in this case again, downstream of the first conveyor belt 11a there can be an auxiliary conveyor 20 that allows to move the dies away from the working position 10 and to carry them toward the first linear conveyor 18 at a greater speed than that of the first conveyor belt 11a.

Advantageously, the machine according to the invention is provided with means 21 for removable connection between the die 3 arranged in the working position 10 and the stuffing tube 6.

Conveniently, as shown in FIG. 9, these removable connection means can comprise a connection ring 21a arranged substantially coaxially to the stuffing tube 6.

More particularly, the connection ring 21a is arranged around the end of the stuffing tube 6 that is directed toward the dies 3 or, as shown in FIGS. 9 and 10, can be arranged around a sleeve 22 that is connected to the stuffing tube 6.

The connection ring 21a is axially movable between an active condition, visible for example in FIG. 10, in which it engages the die 3 that is in the working position 10, and an inactive condition, visible for example in FIG. 9, in which it is disengaged from the die 3 that is in the working position 10, so as to allow the arrangement of a new die 3 in the working position 10.

Advantageously, the dies 3 are each provided with a cylindrical portion 23, which protrudes toward the stuffing tube 6. The connection ring 21a, in the active condition, is arranged so as to straddle the cylindrical portion 23 of the die 3 that is in the working position 10 and the stuffing tube 6, or the sleeve 22, so as to create a continuous connection between the die 3 in the working position 10 and the stuffing tube 6.

Advantageously, the connection ring 21a is provided with sealing gaskets.

The axial movement of the connection ring 21a between the active condition and the inactive condition is provided by means of movement cylinders 24.

Again as shown in FIGS. 9 and 10, at the working position 10, there is, conveniently, a counterpressure plane 25 that is designed to act on the lower face of the die 3 that is in the working position 10.

The counterpressure plane 25 allows to relieve the conveyor means 8 from the pressure applied by the counter-die 3a.

Conveniently, the counterpressure plane 25 can move vertically in order to allow the passage of the die 3 arranged in the working position 10 from a lowered position, shown in FIG. 9, in which the dies 3 are moved by the conveyor means 8, to a raised position, shown in FIG. 10, in which at least the die 3 arranged in the working position 10 is brought correctly into axial alignment with the stuffing tube 6, and vice versa.

The vertical motion of the counterpressure plane 25 is provided by a linear actuator 26 that acts on a mechanism 27 of the linkage type.

Operation of the machine according to the invention is as follows.

With reference to FIGS. 1-3, the operator can load a food product to be stuffed in a die 3 arranged in loading position 9, by inserting it through the cutout 16.

The loaded die 3 is then moved by the first conveyor belt 11a toward the working position 10.

Once the loaded die 3 has reached the working position 10, the conveyor belt 11a is stopped and the counter-die 3a is lowered until it closes the die 3 that is in the working position 10, so as to perform the forming of the product.

Once the forming of the product has finished, the counter-die 3a is lifted again and the pusher means 5 are activated so as to translate the formed product through the stuffing tube 6 until it is inserted in the tubular casing 7, which is subsequently closed, so as to obtain the stuffed product.

At this point the first conveyor belt 11a is actuated again and moves the die 3, which is now empty, away from the working position 10 and arranges in the working position 10 a subsequent die 3 already loaded in the loading position 9.

The empty die 3 that is moved away from the working position 10 then reaches the lowering means 12.

In particular, by way of the actuation of the belt conveyor 12b, the die 3 is carried on the supporting body 12a, which, following the actuation of the actuator cylinder 14, is lowered until the die 3 is brought to the height level of the second conveyor belt 11b, to which the die is then sent, by subsequent actuation of the belt conveyor 12b.

The second conveyor belt 11b conveys the empty die 3 toward the lifting means 13, which subsequently return it to the height level of the first conveyor belt 11a, engaging it in a downward region with the respective supporting body 13a, which is actuated so as to move upwardly.

The empty die 3 thus again reaches the loading position 9, where it can receive a new product to be stuffed.

With reference, instead, to the embodiment of FIGS. 4 and 5, when a die 3 reaches the working position 10 another die 3 is located at the preforming station 17. Once the first conveyor belt 11a has been stopped, the counter-die 3a and the preforming counter-die 17a are lowered in this case onto the respective dies 3.

Once the formed product contained in the die 3 that is in the working position 10 has been stuffed, the conveyor belt 11a is actuated again in order to carry the die 3 that was in the preforming station 17 to the working position 10, at the same time moving the previous die away from the working position 10.

In this case also, the empty dies 3 are returned to the loading position 9 by way of the lowering means 12, the second conveyor belt 11b and the lifting means 13.

With reference to the embodiment of FIGS. 6 and 7, the empty dies 3, after traveling along the second conveyor belt 11b, are transferred onto the first linear conveyor 18, by way of which they reach the lifting means 13, which carry them to the height level of the second linear conveyor 19, along which for example the loading of the dies 3 occurs before their arrival on the first conveyor belt 11a.

With reference to the embodiment of FIG. 8, after the pusher means 5 have stuffed the product contained in it, the die 3 placed in the working position 10 is moved away in the direction of the first linear conveyor 18, which transfers the empty die 3 to the second conveyor belt 11b, from which the die 3 is picked up in order to be conveyed along the second linear conveyor 19, where one or more operators load it with a new product to be stuffed and perform any other processing of the product.

At the end of the second linear conveyor 19, the die 3 again reaches the first conveyor belt 11a, which sends it back toward the working position 10.

It should be noted that along the first linear conveyor 18 and the second conveyor belt 11b it is possible to perform several operations on the empty dies 3, such as for example their cleaning, replacement or others.

With reference to the variation of FIGS. 9 and 10, when a die 3 loaded with the product has reached the working position 10, the counterpressure plane 25 is lifted, so as to engage in a downward region and lift the die 3 that is in the working position 10 until it is brought substantially into axial alignment with the stuffing tube 6.

At this point, the counter-die 3a is lowered, so as to perform the forming of the product, while the connection ring 21a is brought to the active condition, so as to engage the cylindrical portion 23 of the die 3 that is in the working position 10, so as to create the connection between the latter and the stuffing tube 6.

The pusher means 5 are then activated and translate the formed product through the stuffing tube 6 so as to insert it in the tubular casing 7. Once the pusher means 5 have returned to the initial position, the counter-die 3a is lifted again, the connection ring 21a is returned to the inactive position, so as to disengage it from the cylindrical portion 23 of the die 3 that is in the working position 10, and the resting surface is lowered again so as to lower also the die 3 that is in the working position 10, which can be therefore moved away from the working position 10 in order to be replaced by an another die 3 loaded with a new product to be stuffed.

From what has been described above it is evident that the machine according to the invention is capable of fully achieving the intended aim, since it allows, along the entire path followed by the conveyor means, to arrange dies in a position suitable to perform several operations on them and/or on the products loaded therein.

All the characteristics of the invention indicated above as advantageous, convenient or the like may also be omitted or replaced by equivalents.

The individual characteristics described with reference to general teachings or to particular embodiments may all be present in other embodiments or may replace characteristics in these embodiments.

The invention thus conceived is susceptible of numerous modifications and variations, all of which are within the scope of the appended claims.

Thus, for example, the conveyor belts 11a and 11b can each be replaced by a pair of mutually parallel chains closed in a loop around a corresponding pair of driving wheels, so as to both have a corresponding upper branch on which the dies 3 rest.

It should be noted that the presence of the counterpressure plane 25 is particularly useful if the above mentioned pairs of chains are used.

In practice, the materials used, so long as they are compatible with the specific use, as well as the shapes and dimensions, may be any according to requirements.

All the details may further be replaced with other technically equivalent elements.

The disclosures in Italian Patent Application No. VR2015A000053 (102015902342208) from which this application claims priority are incorporated herein by reference.

What is claimed is:

1. A stuffing machine for food products, comprising a framework that supports at least one die, provided with a recess designed to receive a product to be stuffed, and pusher means adapted to translate the product to be stuffed, formed in said die, through a stuffing tube that supports externally a tubular casing designed to surround the product to be stuffed, conveyor means being provided which are adapted to move said at least one die along at least one forward path from at least one loading position, in which said die is adapted to receive the product to be stuffed, to a working position, in which said die is substantially at a region of action of said pusher means, and along at least one return path from said working position to said at least one loading position, wherein said conveyor means are adapted to keep said at least one die with a concavity of said recess directed upwardly along said at least one forward path and along said at least one return path.

2. The machine according to claim 1, wherein said at least one die is simply rested on said conveyor means.

3. The machine according to claim 1, further comprising a plurality of dies moved by said conveyor means.

4. The machine according to claim 1, wherein said at least one forward path and said at least one return path form a closed path.

5. The machine according to claim 1, wherein said at least one forward path and said at least one return path are extended at least partially on planes arranged at mutually different heights with respect to the ground.

6. The machine according to claim 1, wherein said at least one return path is extended on a plane arranged at a lower height than the plane on which said at least one forward path is extended.

7. The machine according to claim 1, wherein said at least one return path is extended on a plane arranged at a greater height than the plane on which said at least one forward is extended.

8. The machine according to claim 1, wherein said at least one forward path and said at least one return path are extended substantially on a same plane.

9. The machine according to claim 1, wherein said at least one forward path and/or at least one return path each have respective portions of path that are extended substantially at right angles to each other.

10. The machine according to claim 1, wherein said conveyor means comprise at least one conveyor belt.

11. A stuffing machine for food products, comprising a framework that supports at least one die, provided with a recess designed to receive a product to be stuffed, and pusher means adapted to translate the product to be stuffed, formed in said die, through a stuffing tube that supports externally a tubular casing designed to surround the product to be stuffed, conveyor means being provided which are adapted to move said at least one die along at least one forward path from at least one loading position, in which said die is adapted to receive the product to be stuffed, to a working position, in which said die is substantially at a region of action of said pusher means, and along at least one return path from said working position to said at least one loading position, wherein said conveyor means are adapted to keep said at least one die with a concavity of said recess directed upwardly along said at least one forward path and along said at least one return path, wherein said conveyor means comprise at least one first conveyor belt that defines at least one portion of said at least one forward path and at least one second conveyor belt that defines at least one portion of said at least one return path, wherein said conveyor means comprise lowering means and lifting means adapted to mutually connect said at least one first conveyor belt and said at least one second conveyor belt.

12. The machine according to claim 11, wherein said conveyor means comprise at least one linear conveyor that is interposed between said at least one first conveyor belt and said at least one second conveyor belt and is extended substantially transversely to said at least one first conveyor belt and said at least one second conveyor belt.

13. A stuffing machine for food products, comprising a framework that supports at least one die, provided with a recess designed to receive a product to be stuffed, and pusher means adapted to translate the product to be stuffed, formed in said die, through a stuffing tube that supports externally a tubular casing designed to surround the product to be stuffed, conveyor means being provided which are adapted to move said at least one die along at least one forward path from at least one loading position, in which said die is adapted to receive the product to be stuffed, to a working position, in which said die is substantially at a region of action of said pusher means, and along at least one return path from said working position to said at least one loading position, wherein said conveyor means are adapted to keep said at least one die with a concavity of said recess directed upwardly along said at least one forward path and along said at least one return path, further comprising means for removable connection between the die arranged in the working position and said stuffing tube.

14. The machine according to claim 13, wherein said removable connection means comprise a connection ring that is arranged substantially coaxially to said stuffing tube and is movable axially between an active condition, in which it is engaged with at least one portion of the die that is in the working position, and an inactive condition, in which it is disengaged from the die that is in the working position.

15. A stuffing machine for food products, comprising a framework that supports at least one die, provided with a recess designed to receive a product to be stuffed, and pusher means adapted to translate the product to be stuffed, formed in said die, through a stuffing tube that supports externally a tubular casing designed to surround the product to be stuffed, conveyor means being provided which are adapted to move said at least one die along at least one forward path from at least one loading position, in which said die is adapted to receive the product to be stuffed, to a working position, in which said die is substantially at a region of action of said pusher means, and along at least one return path from said working position to said at least one loading position, wherein said conveyor means are adapted to keep said at least one die with a concavity of said recess directed upwardly along said at least one forward path and along said at least one return path, further comprising a counterpressure plane adapted to engage in a lower region the die that is in the working position.

* * * * *